United States Patent
Hussain et al.

(10) Patent No.: US 11,538,378 B1
(45) Date of Patent: Dec. 27, 2022

(54) DIGITAL CONTENT ADJUSTMENT IN A FLEXIBLE DISPLAY DEVICE

(71) Applicant: INTERNATIONAL BUSINESS MACHINES CORPORATION, Armonk, NY (US)

(72) Inventors: Mohamed Jawahar Hussain, Bangalore (IN); Sarbajit K. Rakshit, Kolkata (IN); Manjit Singh Sodhi, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/404,191

(22) Filed: Aug. 17, 2021

(51) Int. Cl.
  G09G 3/00 (2006.01)
  G06F 3/01 (2006.01)
  G06T 7/50 (2017.01)

(52) U.S. Cl.
  CPC ............ G09G 3/035 (2020.08); G06F 3/01 (2013.01); G06F 3/011 (2013.01); G06F 3/012 (2013.01);
  (Continued)

(58) Field of Classification Search
  CPC .... G09G 3/035; G09G 2354/00; G06F 3/011; G06F 3/012; G06F 3/013; G06F 3/014;
  (Continued)

(56) References Cited

U.S. PATENT DOCUMENTS 7,714,801 B2   5/2010  Kimmel
8,692,778 B2 *  4/2014  Kim ...................... G06F 3/0416
                                          345/173
(Continued)

FOREIGN PATENT DOCUMENTS

EP        2500894 A1    9/2012
KR     20080065738 A    7/2008
WO     2019056777 A1    3/2019

OTHER PUBLICATIONS

CNET, "LG OLED TV rolls up like a piece of paper," YouTube, Jan. 7, 2016, Retrieved from the Internet: https://www.youtube.com/watch?v=KHSdObeUdxl, 4 pages.
(Continued)

*Primary Examiner* — Vijay Shankar
(74) *Attorney, Agent, or Firm* — Robert R. Aragona

(57) ABSTRACT

An embodiment for adjusting digital content in a flexible display device based on a surface profile of the flexible display device and viewing direction of a user is provided. The embodiment may include receiving a surface profile of a flexible display device. The embodiment may also include in response to determining the surface profile does not indicate that a flexible display device surface is flat, identifying a viewing direction of a user relative to the surface profile. The embodiment may further include identifying an optimal viewing configuration of the flexible display device. The embodiment may also include presenting the optimal viewing configuration to the user. The embodiment may further include adjusting a display of digital content on a screen of the flexible display device. The embodiment may also include receiving feedback from the user regarding a preferred viewing direction and a preferred configuration of the flexible display device.

20 Claims, 7 Drawing Sheets

(52) U.S. Cl.
CPC ............... G06F 3/013 (2013.01); G06T 7/50 (2017.01); *G09G 2354/00* (2013.01)

(58) Field of Classification Search
CPC ...... G06F 3/016; G06F 3/017; G06F 3/04815; G06F 2203/04805; G06T 7/50
See application file for complete search history.

(56) References Cited

U.S. PATENT DOCUMENTS

| | | | |
|---|---|---|---|
| 9,058,758 B2* | 6/2015 | Shin | G06F 1/1601 |
| 9,326,375 B2 | 4/2016 | Lee | |
| 9,459,656 B2 | 10/2016 | Shai | |
| 9,891,442 B2* | 2/2018 | Gu | G06F 1/1652 |
| 9,939,648 B2* | 4/2018 | Lee | G02B 27/0172 |
| 10,242,280 B2* | 3/2019 | Krafka | G06V 10/25 |
| 10,720,123 B2* | 7/2020 | Liu | G09G 3/001 |
| 2011/0291988 A1* | 12/2011 | Bamji | G06F 3/0428 |
| | | | 345/175 |
| 2016/0019720 A1* | 1/2016 | Thurber | G02B 27/017 |
| | | | 345/419 |
| 2016/0372083 A1* | 12/2016 | Taite | G06F 3/04886 |
| 2016/0377869 A1* | 12/2016 | Lee | G02B 27/0172 |
| | | | 359/631 |
| 2017/0038928 A1* | 2/2017 | Park | G06V 40/10 |
| 2017/0115489 A1* | 4/2017 | Hu | G06T 19/006 |
| 2017/0127535 A1 | 5/2017 | Shin | |
| 2019/0340964 A1 | 11/2019 | Kwon | |
| 2020/0036935 A1 | 1/2020 | Lee | |
| 2020/0111441 A1 | 4/2020 | Liu | |

OTHER PUBLICATIONS

Disclosed Anonymously, "Method and System for Automatic Alignment of Projection for Dynamic Screen Angle Changes," IP.com, IP.com No. IPCOM000239179D, IP.com Publication Date: Oct. 20, 2014, 4 pages.

McFadden, "What Happened to the Curved TVs Anyway?," Interesting Engineering, Jan. 30, 2021, Retrieved from the Internet: https://interestingengineering.com/which-is-better-curved-or-flat-screen-tvs, 14 pages.

Mell et al., "The NIST Definition of Cloud Computing", Recommendations of the National Institute of Standards and Technology, NIST Special Publication 800-145, Sep. 2011, 7 pages.

* cited by examiner

US 11,538,378 B1

DIGITAL CONTENT ADJUSTMENT IN A FLEXIBLE DISPLAY DEVICE

BACKGROUND

The present invention relates generally to the field of computing, and more particularly to a system for adjusting digital content in a flexible display device based on a surface profile of the flexible display device and viewing direction of a user.

Flexible display devices have become popular consumer products in recent memory. These flexible display devices may include TVs, mobile devices, laptop and desktop computers, as well as wall mounted devices which utilize flexible organic light-emitting diodes (OLED). Using flexible display technology, a user may fold, bend, stretch, and/or roll the flexible display device. Such capabilities may allow for an enhanced viewing experience for the user, and may also provide for easier portability, such as when travelling by car, train, bus, and/or plane. As technology continues to improve, the demand for flexible display devices is expected to increase in the coming years.

SUMMARY

According to one embodiment, a method, computer system, and computer program product for adjusting digital content in a flexible display device based on a surface profile of the flexible display device and viewing direction of a user is provided. The embodiment may include receiving a surface profile of a flexible display device. The embodiment may also include in response to determining the surface profile does not indicate that a flexible display device surface is flat, identifying a viewing direction of a user relative to the surface profile. The embodiment may further include identifying an optimal viewing configuration of the flexible display device based on the viewing direction of the user. The embodiment may also include presenting the optimal viewing configuration to the user. The embodiment may further include adjusting a display of digital content on a screen of the flexible display device based on the identified optimal viewing configuration.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
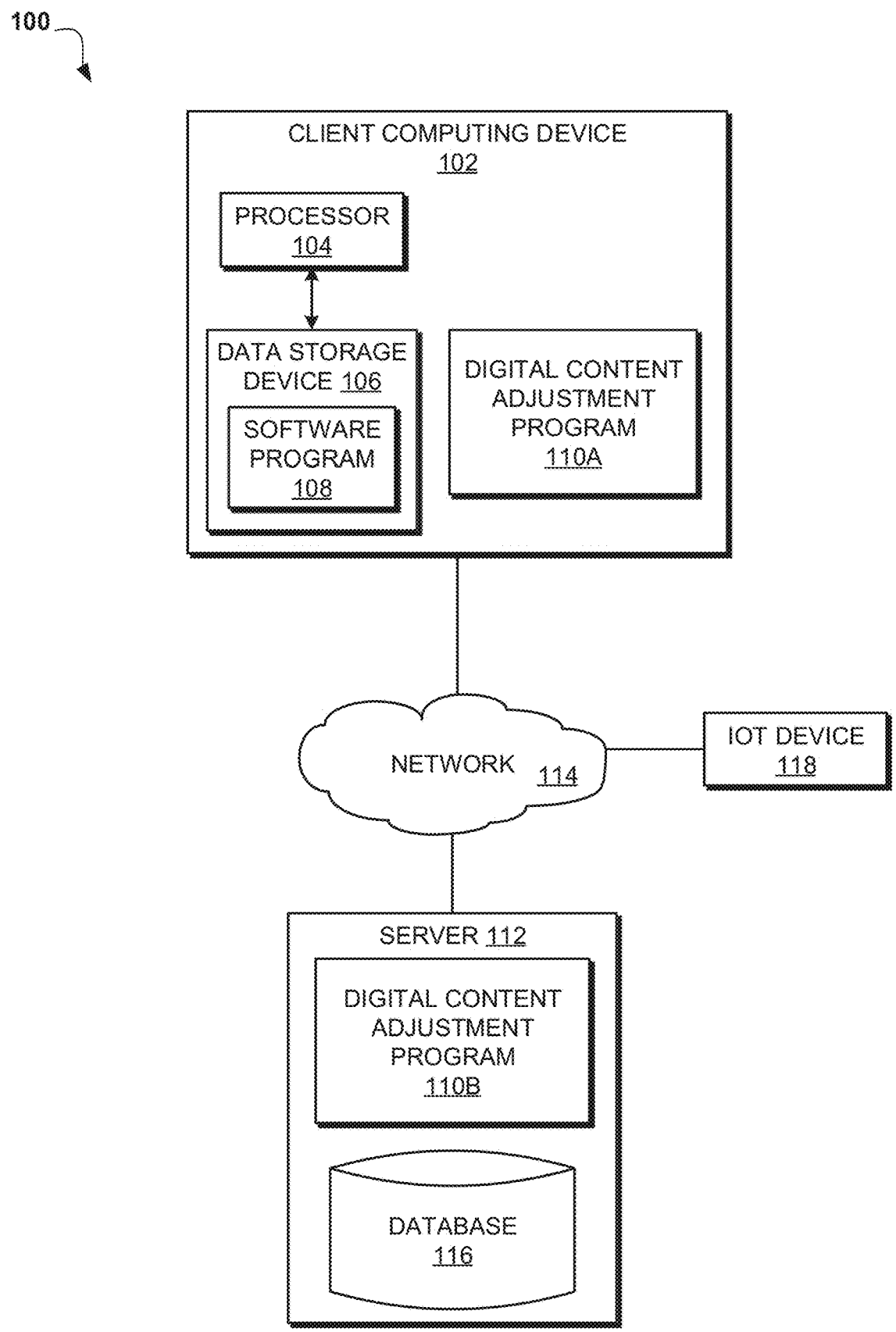
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for adjusting digital content in a flexible display device based on a surface profile of the flexible display device and viewing direction of a user. The following described exemplary embodiments provide a system, method, and program product to, among other things, identify an optimal viewing configuration of the flexible display device and, accordingly, adjust a display of digital content on a screen of the flexible display device based on the identified optimal viewing configuration. Therefore, the present embodiment has the capacity to improve flexible display technology by preventing the distortion of images when the flexible display device is viewed in a concave or convex position.

As previously described, flexible display devices have become popular consumer products in recent memory. These flexible display devices may include TVs, mobile devices, laptop and desktop computers, as well as wall mounted devices which utilize flexible organic light-emitting diodes (OLED). Using flexible display technology, a user may fold, bend, stretch, and/or roll the flexible display device. Such capabilities may allow for an enhanced viewing experience for the user, and may also provide for easier portability, such as when travelling by car, train, bus, and/or plane. As technology continues to improve, the demand for flexible display devices is expected to increase in the coming years. If a surface of the flexible display device is not flat (e.g., due to bending and/or stretching), the display of digital content may be distorted. For example, the user who is viewing digital content on the flexible display device may not be able to properly view the digital content closest to the edges of the flexible display device. This problem is typically addressed by placing flexible display sheets or other flexible elements over the surface of the flexible display device to properly display the digital content. However, flexible display sheets fail to guide the user as to how to configure the flexible display device (e.g., how to bend and/or stretch the flexible display device). It may therefore be imperative to have a system in place to analyze a viewing direction of the user along with the surface profile of the flexible display device so that digital content may be displayed clearly and without distortion of images. Thus, embodiments of the present invention may provide advantages including, but not limited to, determining the surface profile of the flexible display device and the viewing direction of the user in real-time, enabling the user to view digital content clearly regardless of the configuration of the flexible display device, and learning preferred viewing directions and flexible display device configurations based on user feedback. The present invention does not require that all advantages need to be incorporated into every embodiment of the invention.

According to at least one embodiment, when a user is viewing content on a flexible display device, a surface profile of a flexible display device may be received in order to determine whether the surface profile indicates that a flexible display device surface is flat. In response to determining the surface profile does not indicate that the flexible display device surface is flat, a viewing direction of the user may be identified relative to the surface profile. For example, the user may be looking directly at the flexible display device, or may be looking at the flexible display device from an angle, explained in further detail below with respect to FIGS. 2-4. Upon identifying the viewing direction of the user, an optimal viewing configuration of the flexible display device may be identified so that the optimal viewing configuration can be presented to the user. A display of digital content on a screen of the flexible display device may then be adjusted based on the identified optimal viewing configuration such that displayed images are not distorted. User feedback regarding a preferred viewing direction and a preferred configuration of the flexible display device may be received and the preferred viewing direction and configuration may be recorded based on the feedback for a streamlined viewing experience in the future.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify an optimal viewing configuration of the flexible display device and, accordingly, adjust a display of digital content on a screen of the flexible display device based on the identified optimal viewing configuration.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a digital content adjustment program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a digital content adjustment program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes an AR device, such as headsets, smart glasses, smart contact lenses and/or any other AR device known in the art for enhancing the user's visual surroundings that is capable of connecting to the communication network 114, and transmitting and receiving data with the client computing device 102 and the server 112.

According to the present embodiment, the digital content adjustment program 110A, 110B may be a program capable of receiving a surface profile of a flexible display device from a plurality of sensors, identifying an optimal viewing configuration of the flexible display device, adjusting a display of digital content on a screen of the flexible display device based on the identified optimal viewing configuration, determining the surface profile of the flexible display device and the viewing direction of the user in real-time, enabling the user to view digital content clearly regardless of the configuration of the flexible display device, and learning preferred viewing directions and flexible display device configurations based on user feedback. The digital content adjustment method is explained in further detail below with respect to FIG. 2.

Figure 2:
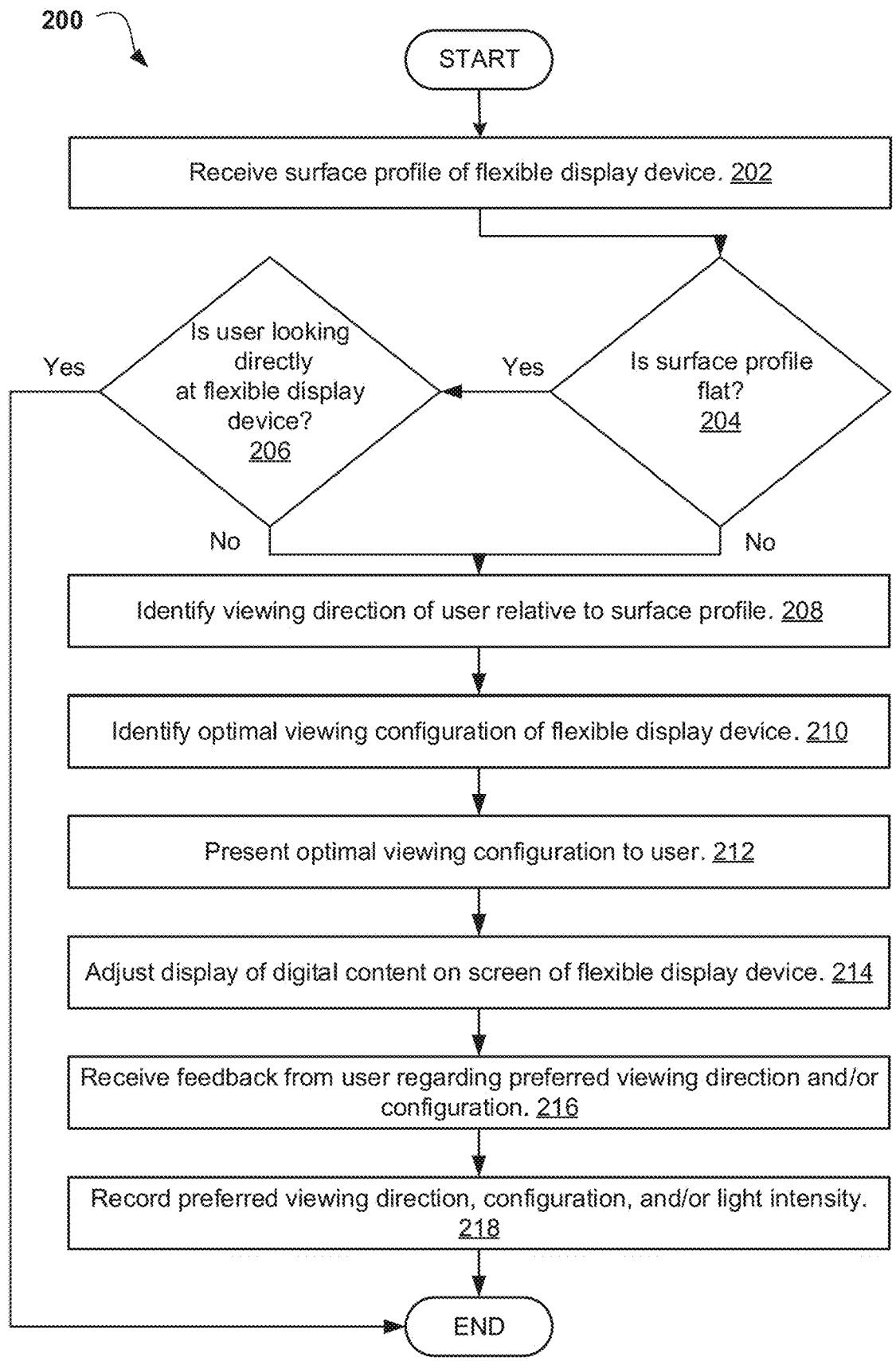
FIG. 2 illustrates an operational flowchart for adjusting digital content in a flexible display device based on a surface profile and viewing direction in a digital content adjustment process according to at least one embodiment.

Referring now to FIG. 2, an operational flowchart for adjusting digital content in a flexible display device based on a surface profile and viewing direction in a digital content adjustment process 200 is depicted according to at least one embodiment. At 202, the digital content adjustment program 110A, 110B receives the surface profile of the flexible display device. The surface profile may be received from a plurality of bend and stress sensors which are embedded in the flexible display device. For example, the bend and stress sensors may be embedded in a smartphone, tablet, laptop, and/or television. These flexible display devices may be bent, folded, stretched, and/or curved into various configurations. For example, if the flexible display device is bent from a flat position, a signal strength of the bend and stress sensors may fluctuate, thus indicating the user is changing the configuration. It may be appreciated that in embodiments of the present invention, the surface profile may be identified in real-time.

Then, at 204, the digital content adjustment program 110A, 110B determines whether the surface profile indicates that the flexible display device surface is flat. As described above, the digital content adjustment program 110A, 110B may receive a signal from the plurality of bend and stress sensors, and determine the surface profile of the flexible display device based on the signal strength of these bend and stress sensors. For example, if the flexible display device is flat (i.e., in an unbended and unfolded position), it may be expected that the signal detected from the plurality of bend and stress sensors would be substantially the same across the surface of the flexible display device. As used herein, signals are "substantially the same" when a detected signal is within "0.1" of another detected signal. Thus, if a full signal strength is "1," if each of the bend and stress sensors has a detected signal of "1" or "0.9," the surface profile of the flexible display device may be determined to be a flat surface.

In response to determining the surface profile does indicate that the flexible display device surface is flat (step 204, "Yes" branch), the digital content adjustment process 200 proceeds to step 206 to determine whether the user is looking directly at the flexible display device. In response to determining the surface profile does not indicate that the flexible display device surface is flat (step 204, "No" branch), the digital content adjustment process 200 proceeds to step 208 to identify a viewing direction of the user relative to the surface profile.

Next, at 206, the digital content adjustment program 110A, 110B determines whether the user is looking directly at the flexible display device. As described above, IoT Device 118 (FIG. 1) includes an AR device, such as headsets, smart glasses, smart contact lenses and/or any other AR device known in the art for enhancing the user's visual surroundings that is capable of connecting to the communication network 114 (FIG. 1), and transmitting and receiving data with the client computing device 102 (FIG. 1) and the server 112 (FIG. 1). This AR device may be utilized to determine whether the user is looking directly at the flexible display device. A midpoint of the flexible display device may first be identified. The midpoint of a flexible display device in a flat position may be determined based on the length and width dimensions of the flexible display device. For example, if a smartphone is six inches long and three inches wide, the midpoint would be three inches from either the top or bottom and one and a half inches from either side. Once the midpoint is determined, the AR device may be used to detect an angle from that midpoint. If the angle between the AR device and the midpoint is 0° (or 180°), then it may be determined that the user is looking directly at the flexible display device. Contrarily, if the angle between the AR device is between 0° and 90°, it may be determined that the user is not looking directly at the flexible display device.

In response to determining the user is looking directly at the flexible display device (step 206, "Yes" branch), the digital content adjustment process 200 ends, since the flexible display device is flat and the user is looking directly at the flexible display device. In response to determining the user is not looking directly at the flexible display device (step 206, "No" branch), the digital content adjustment process 200 proceeds to step 208 to identify the viewing direction of the user relative to the surface profile.

Then, at 208, the digital content adjustment program 110A, 110B identifies the viewing direction of the user relative to the surface profile. The viewing direction may be a viewing angle of the user from a restructured midpoint of the flexible display device. It may be appreciated that the midpoint described above may be used when the flexible display device is flat and the user is looking directly at the flexible display device, in which case the digital content adjustment process 200 ends. Details on calculating the restructured midpoint are described in further detail below with respect to FIG. 4.

According to at least one embodiment, the AR device may be used to detect the signal strength of the plurality of bend and stress sensors. As described above, if the flexible display device is bent from a flat position, a signal strength of the bend and stress sensors may fluctuate, thus indicating the user is changing the configuration. For example, if the user bends the edges of the flexible display device away from their body, forming a convex surface of the flexible display device, the AR device may detect a weaker signal from the plurality of bend and stress sensors closer to the edges, thus indicating an outward curve of the flexible display device. Continuing the example, if the user bends the edges of the flexible display device towards their body, forming a concave surface of the flexible display device, the AR device may detect a stronger signal from the plurality of bend and stress sensors closer to the edges, thus indicating an inward curve of the flexible display device. Therefore, in some embodiments of the present invention, the signal strength of the plurality of bend and stress sensors, as detected in real-time, may be used to determine the surface profile of the flexible display device. The viewing direction of the user may also be detected by the AR device based on the signal strength of the plurality of bend and stress sensors at different locations on the flexible display device. For example, if the AR device detects the strongest signal (e.g., "1") from the plurality of bend and stress sensors on a right side of the flexible display device, a weaker signal (e.g., "0.6") from the plurality of bend and stress sensors near the center of the flexible display device, and a weakest signal (e.g., "0.3") from the plurality of bend and stress sensors on a left side of the flexible display device, it may be determined the user is viewing the flexible display device from the right side. Similarly, if the AR device detects a signal of "0.9" from the plurality of bend and stress sensors on both the left and right edges of the flexible display device, and a signal of "0.5" from the plurality of bend and stress sensors closest to the center of the flexible display device, it may be determined that the user is sitting or standing somewhere in front of the flexible display device (e.g., at an angle of 15° or less from the restructured midpoint).

According to at least one other embodiment, the AR device may perform computer vision techniques in addition to utilizing the plurality of bend and stress sensors to identify any change in the configuration of the flexible display device. For example, the AR device may analyze a current configuration of the flexible display device and, based on prior learning from past images of flexible display devices in various configurations, compare the current configuration with the past images.

Then, at 210, the digital content adjustment program 110A, 110B identifies the optimal viewing configuration of the flexible display device. The optimal viewing configuration is based on the viewing direction of the user. For example, if the user is viewing the flexible display device from the right, and the flexible display device is currently flat, the digital content adjustment program 110A, 110B may identify a concave configuration of the flexible display device as the optimal viewing configuration. Similarly, if the user is standing or sitting somewhere in front of the flexible display device, and the flexible display device is currently in either a convex or concave configuration, the digital content adjustment program 110A, 110B may identify a lesser curve (i.e., a flatter surface) of the flexible display device as the optimal viewing configuration. These optimal viewing configurations may then be presented to the user as guidance for how they should configure the flexible display device, described in further detail below with respect to step 212.

Figure 3:
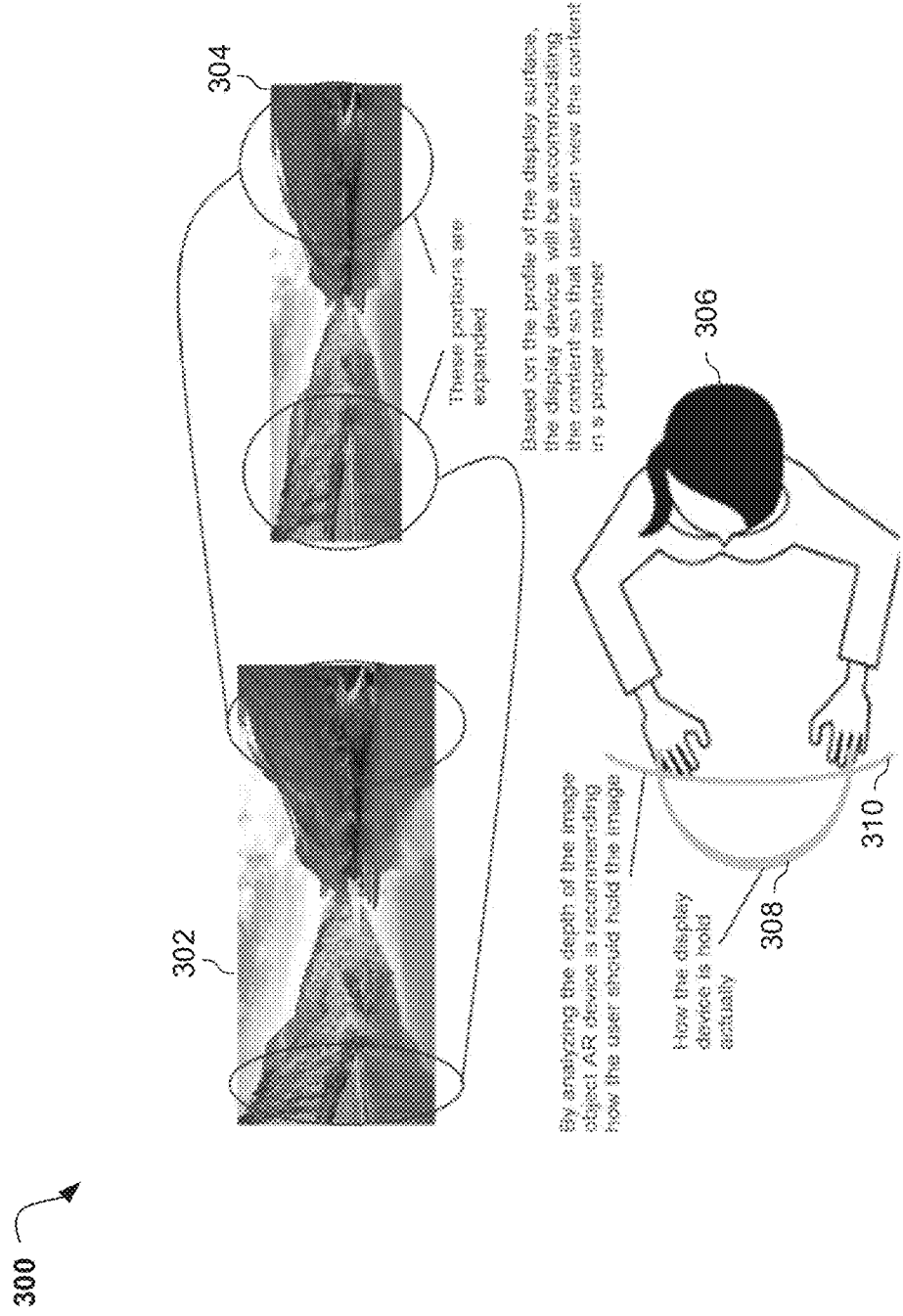
FIG. 3 is a diagram depicting the display of digital content on a flexible display device and the guidance of a user as to how to hold the flexible display device according to at least one embodiment.

Next, at 212, the digital content adjustment program 110A, 110B presents the optimal viewing configuration of the flexible display device to the user. The optimal viewing configuration may be presented to the user via the AR device. According to at least one embodiment, the AR device may present the optimal viewing configuration to the user as a digital image overlay, as shown in FIG. 3. For example, when the user is wearing the AR device, the AR device can display in the field of view two images, with one image being the current configuration of the flexible display device, and the other image being the identified optimal viewing configuration of the flexible display device. The overlayed images may be in different colors to assist the user in determining which image is the current configuration and which image is the optimal viewing configuration. Once the colors merge, the current configuration of the flexible display device matches the optimal viewing configuration of the flexible display device.

According to at least one other embodiment, the AR device may present the optimal viewing configuration to the user as guided audio and/or written instructions. For example, when the user is wearing the AR device, the AR device can display text and/or dictate instructions to the user as to how to reconfigure the flexible display device so that the optimal viewing configuration can be achieved. Continuing the example, the text and/or audio may say, "Bend the edges of the flexible display device approximately three inches towards you." As another example, the text and/or audio may say, "Stretch the flexible display device approximately two inches away from the center." The text and/or audio may be modified if the user incorrectly estimated the distance. For example, if the user bent the flexible display device only two inches instead of three inches, text and/or audio may then say, "Continue bending the flexible display device one more inch towards you."

Then, at 214, the digital content adjustment program 110A, 110B adjusts the display of digital content on the screen of the flexible display device. The adjustment is based on the identified optimal viewing configuration described above. The adjustment may be made by expanding or contracting pixels in the flexible display device, described in further detail below with respect to FIG. 4. It may be appreciated that in embodiments of the present invention, the display of digital content may be adjusted in real-time. Thus, if the viewing direction of the user and/or the surface profile of the flexible display device change, the display of digital content may be adjusted accordingly. For example, if the user is viewing the flexible display device from a position such that the optimal viewing configuration of the flexible display device is a concave configuration, the display of digital content may be adjusted to properly fill a screen in the concave configuration. Contrarily, if the user is viewing the flexible display device from a position such that the optimal viewing configuration of the flexible display device is a convex configuration, the display of digital content may be adjusted to properly fill a screen in the convex configuration.

According to at least one embodiment, the digital content adjustment program 110A, 110B may also utilize a generative adversarial network (GAN) module to adjust the display of digital content on the screen of the flexible display device. As described above, the signal strength from the plurality of bend and stress sensors may be used to identify, in real-time, the surface profile of the flexible display device and the viewing direction of the user relative to the surface profile. The detected signal strength may be fed to the GAN as input, and based on the surface profile of the flexible display device and the viewing direction of the user, the GAN may predict, as output, how the display of digital content should be adjusted.

According to at least one embodiment, the digital content may be configured to be displayed in 3D in accordance with certain surface profile configurations. The depth of the digital content to be displayed on the screen of the flexible display device may be analyzed in order to determine whether the digital content can be displayed in 3D. If the digital content is configured to be displayed on the screen of the flexible display device in 3D, the digital content adjustment program 110A, 110B may present to the user a 3D viewing configuration of the flexible display device in a manner similar to presenting the optimal viewing configuration as described above with respect to step 212 (e.g., by a digital image overlay or text and/or audio instructions presented via the AR device).

Next, at 216, the digital content adjustment program 110A, 110B receives feedback from the user regarding a preferred viewing direction and a preferred configuration of the flexible display device. The feedback may be in the form of a voice of the user, a facial expression of the user, and/or an eye gesture of the user. For example, when the user is presented with the optimal viewing configuration of the flexible display device, the user may explicitly say that the optimal viewing configuration is their preferred configuration, or the user may say that another viewing configuration is their preferred configuration. Continuing the example, the user may also say that when the flexible display device is bent in a convex configuration, they like to stand 30° from the right of the flexible display device.

According to at least one other embodiment, the feedback may be a facial expression of the user. For example, when the user is presented with the optimal viewing configuration of the flexible display device, the user may smile if the optimal viewing configuration is their preferred viewing configuration, and the user may frown if another viewing configuration is their preferred viewing configuration. If the user frowns, alternative viewing configurations may be presented to the user via the AR device until the user smiles when being presented with one of the alternative viewing configurations.

According to at least one further embodiment, the feedback may be an eye gesture of the user. For example, when the user is presented with the optimal viewing configuration of the flexible display device, the user may blink once if the optimal viewing configuration is their preferred viewing configuration, and the user may move their eyes to the left or right if another viewing configuration is their preferred viewing configuration. Alternative viewing configurations may be presented to the user via the AR device until the user blinks twice when being presented with one of the alternative viewing configurations.

Then, at 218, the digital content adjustment program 110A, 110B records the preferred viewing direction and the preferred configuration of the flexible display device. The recording is based on the received feedback described above with respect to step 216. According to at least one embodiment, the light intensity, captured via a plurality of light sensors embedded in the flexible display device, may be recorded at the time the preferred configuration of the flexible display device is recorded. The recordings may be stored in the cloud, described below with respect to FIGS. 6 and 7, and suggested to the user during a future viewing for a faster optimal viewing experience. According to at least one other embodiment, the recordings of one user may be presented to other users so that the other users can get another perspective.

Referring now to FIG. 3, a diagram 300 depicting the display of digital content on a flexible display device and the guidance of a user as to how to hold the flexible display device is presented according to at least one embodiment. A distorted image 302 and an adjusted image 304 are shown. The user 306 may be looking at and bending the flexible display device 308 into a concave configuration. However, the concave configuration being formed by the user 306 may cause the distorted image 302 shown in the diagram 300. In order for the user 306 to enjoy the optimal viewing experience, the AR device may present the optimal viewing configuration of the flexible display device 308 as the digital image overlay 310. The digital image overlay 310 may be used to guide the user 306, based on the current viewing direction of the user 306, as to how the flexible display device 308 should be held so that the distorted image 302 may be transformed, by expanding or contracting pixels, into the adjusted image 304.

Figure 4:
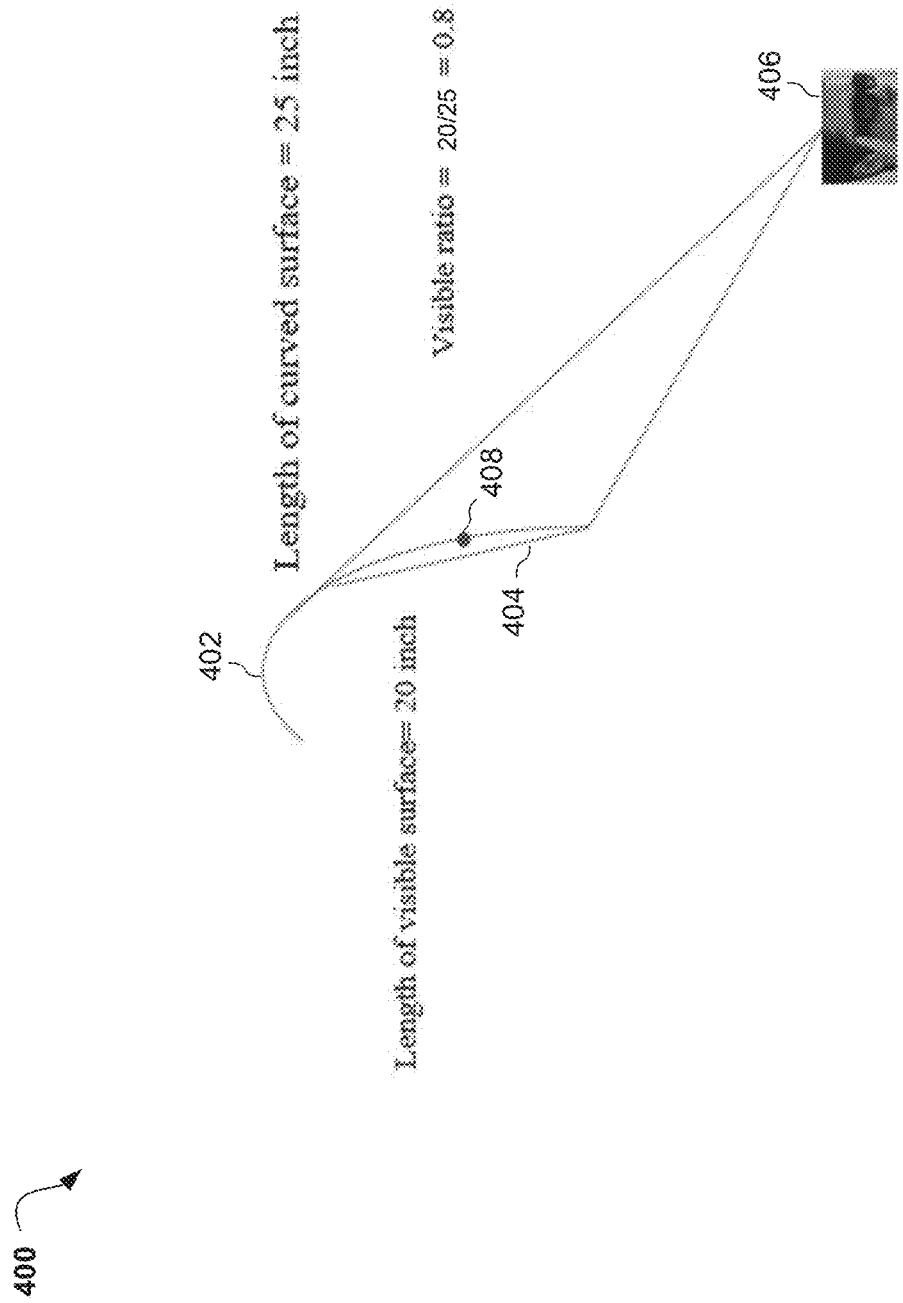
FIG. 4 is a diagram depicting a curved surface and visible surface of the flexible display device in FIG. 3 according to at least one embodiment.

Referring now to FIG. 4, a diagram 400 depicting a curved surface 402 and visible surface 404 of the flexible display device in FIG. 3 is presented according to at least one embodiment. In the diagram 400, an example of how the restructured midpoint 408 is determined is shown. In the example, the length of the curved surface 402 is 25 inches, the length of the visible surface 404 is 20 inches, and the visible ratio is 20/25=0.8 (i.e., 80% of the flexible display device surface is visible from the viewing direction of the user 406). The original center may be determined, (i.e., Original center=Midpoint of visible surface/2). In the example, the Original center is 20/2=10 inches. However, the Original center should not be considered the actual midpoint since one half of the visible ratio has a stronger signal detection from the bend and stress sensors, and the other half of the visible ration has a weaker signal detection from the bend and stress sensors. A segment length may also be determined, (i.e., Segment length=signal strength average X visible surface length of segment). In the example, the segment lengths may be divided into "Segment A" and "Segment B," with "Segment A" being the lower half of the visible surface 404 and "Segment B" being the upper half of the visible surface 404. If the average signal strength of the lower half of the visible surface 404 is 0.9, and the average signal strength of the upper half of the visible surface is 0.7, then "Segment A"=10×(0.9)=9.0 and "Segment B"=10× (0.7)=7.0. Since a stronger signal strength is detected from "Segment A", this may mean that "Segment A" has a greater scope for display than "Segment B." In the example, the division ratio is "Segment A"/"Segment B"=9.0/7.0=1.28. However, as described above, a division ratio=1 is desired. Then, the restructured midpoint 408 may be determined, (i.e., Restructured midpoint=move x pixel toward left or right from center until Division Ratio is 1 between "Segment A" and "Segment B"). Rounding 1.28 down to the nearest quarter (i.e., 1.25), the restructured midpoint 408 may be moved 1.25 inches toward the lower half of the visible surface 404 from the Original center. Once the restructured midpoint 408 is determined, the stretch ratios of "Segment A" and "Segment B" may be determined. If the stretch ratio is greater than 1, the pixels of the flexible display device may be expanded relative to the segment length. If the stretch ratio is less than 1, the pixels of the flexible display device may be contracted relative to the segment length. In the example, the stretch ratio of "Segment A"=8.75/10=0.875 and the stretch ratio of "Segment B"=11.25/10=1.125. Thus, a 10 inch wide image on the lower half of the visible surface 404 ("Segment A") may be projected to 8.75 inches, and a 10 inch wide image on the upper half of the visible surface 404 ("Segment B") may be projected to 11.25 inches.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
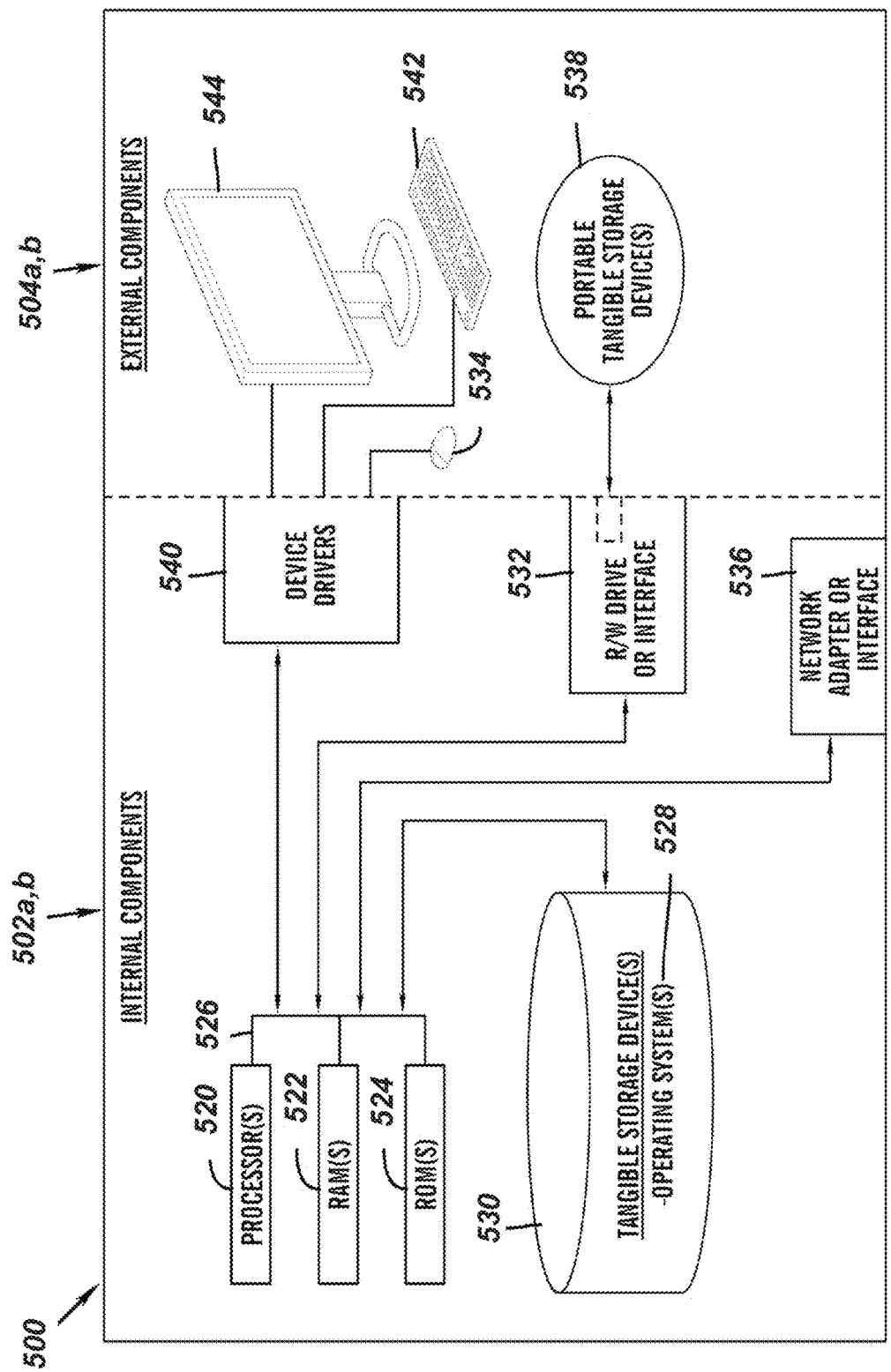
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the digital content adjustment program 110A in the client computing device 102 and the digital content adjustment program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the digital content adjustment program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the digital content adjustment program 110A in the client computing device 102 and the digital content adjustment program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the digital content adjustment program 110A in the client computing device 102 and the digital content adjustment program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
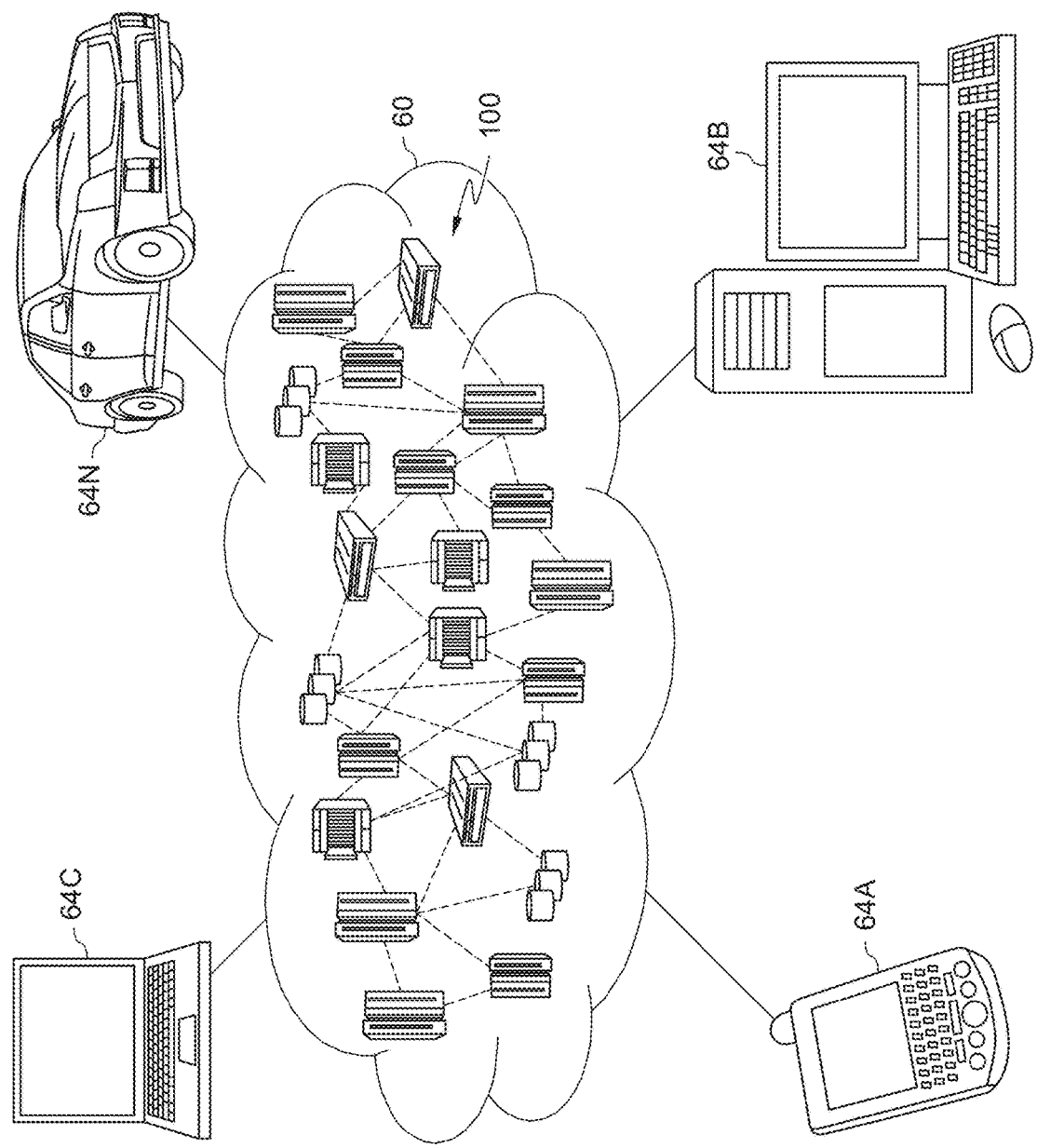
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
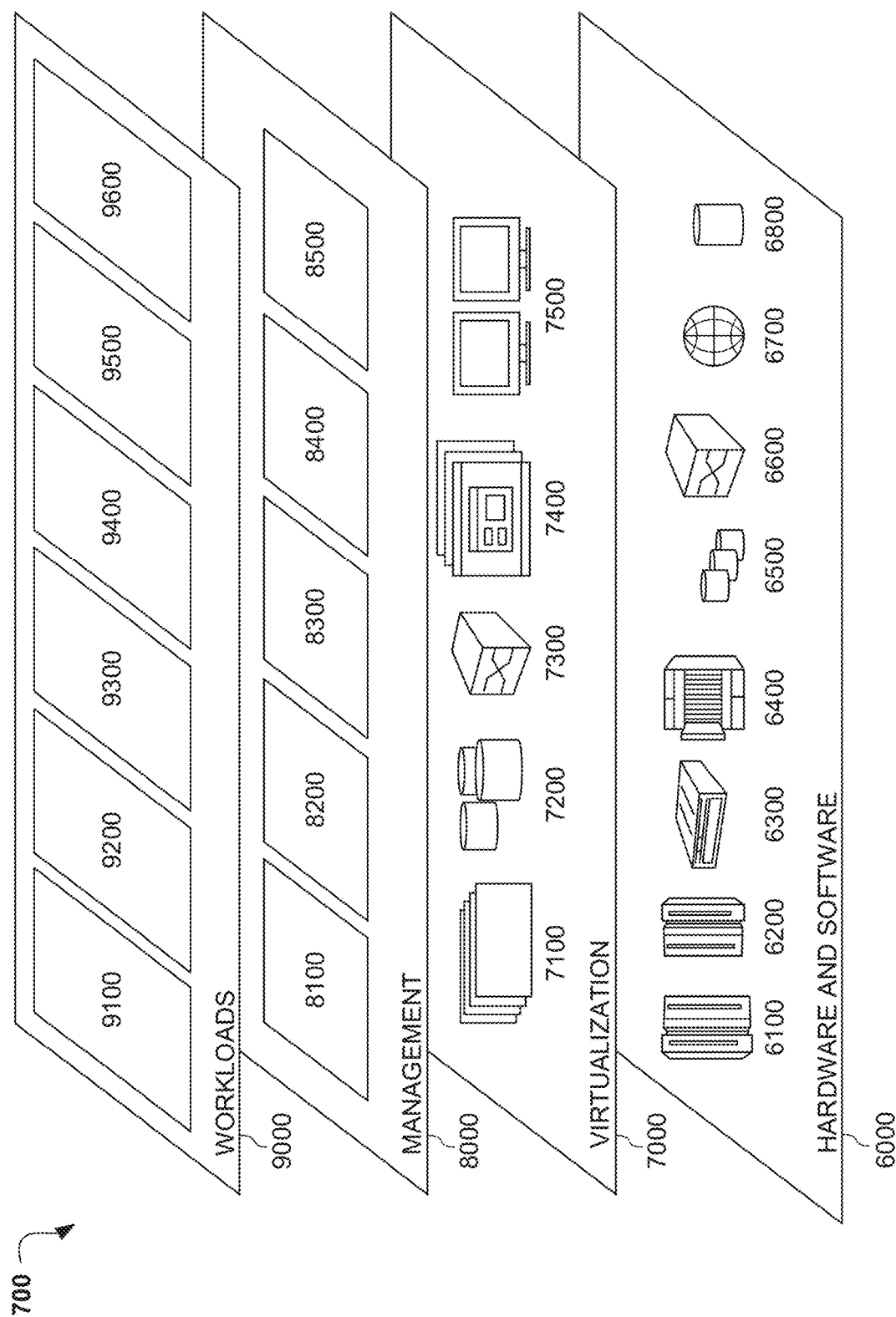
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and adjusting digital content in a flexible display device based on a surface profile of the flexible display device and viewing direction of a user 9600. Adjusting digital content in a flexible display device based on a surface profile of the flexible display device and viewing direction of a user 9600 may relate to identifying an optimal viewing configuration of the flexible display device in order to adjust a display of digital content on a screen of the flexible display device based on the identified optimal viewing configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of adjusting digital content in a flexible display device, the method comprising:
   receiving a surface profile of a flexible display device;
   determining whether the surface profile indicates that a flexible display device surface is flat;
   in response to determining the surface profile does not indicate that the flexible display device surface is flat, identifying a viewing direction of a user relative to the surface profile;
   identifying an optimal viewing configuration of the flexible display device based on the viewing direction of the user;
   presenting the optimal viewing configuration to the user via an augmented reality (AR) device in communication with the flexible display device; and
   adjusting a display of digital content on a screen of the flexible display device based on the identified optimal viewing configuration.

2. The method of claim 1, further comprising:
   receiving feedback from the user regarding a preferred viewing direction and a preferred configuration of the flexible display device; and
   recording the preferred viewing direction and the preferred configuration of the flexible display device based on the received feedback.

3. The method of claim 2, wherein the feedback is selected from a group consisting of a voice of the user, a facial expression of the user, and an eye gesture of the user.

4. The method of claim 1, further comprising:
   in response to determining the surface profile does indicate that the flexible display device surface is flat, determining whether the user is looking directly at the flexible display device; and
   in response to determining the user is not looking directly at the flexible display device, identifying the viewing direction of the user relative to the surface profile.

5. The method of claim 1, wherein the surface profile is received from a plurality of bend and stress sensors embedded in the flexible display device.

6. The method of claim 1, wherein the augmented reality (AR) device is used to present the optimal viewing configuration to the user as a digital image overlay.

7. The method of claim 1, wherein adjusting the display of digital content on the screen of the flexible display device further comprises:
   analyzing a depth of the digital content;
   determining whether the digital content is configured to be displayed in 3D based on the depth; and in response to determining the digital content is configured to be displayed in 3D, presenting a 3D viewing configuration of the flexible display device to the user.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a surface profile of a flexible display device;
determining whether the surface profile indicates that a flexible display device surface is flat;
in response to determining the surface profile does not indicate that the flexible display device surface is flat, identifying a viewing direction of a user relative to the surface profile;
identifying an optimal viewing configuration of the flexible display device based on the viewing direction of the user;
presenting the optimal viewing configuration to the user via an augmented reality (AR) device in communication with the flexible display device; and
adjusting a display of digital content on a screen of the flexible display device based on the identified optimal viewing configuration.

9. The computer system of claim 8, further comprising:
receiving feedback from the user regarding a preferred viewing direction and a preferred configuration of the flexible display device; and
recording the preferred viewing direction and the preferred configuration of the flexible display device based on the received feedback.

10. The computer system of claim 9, wherein the feedback is selected from a group consisting of a voice of the user, a facial expression of the user, and an eye gesture of the user.

11. The computer system of claim 8, further comprising:
in response to determining the surface profile does indicate that the flexible display device surface is flat, determining whether the user is looking directly at the flexible display device; and
in response to determining the user is not looking directly at the flexible display device, identifying the viewing direction of the user relative to the surface profile.

12. The computer system of claim 8, wherein the surface profile is received from a plurality of bend and stress sensors embedded in the flexible display device.

13. The computer system of claim 8, wherein the augmented reality (AR) device is used to present the optimal viewing configuration to the user as a digital image overlay.

14. The computer system of claim 8, wherein adjusting the display of digital content on the screen of the flexible display device further comprises:
analyzing a depth of the digital content;
determining whether the digital content is configured to be displayed in 3D based on the depth; and
in response to determining the digital content is configured to be displayed in 3D, presenting a 3D viewing configuration of the flexible display device to the user.

15. A computer program product, the computer program product comprising:
one or more computer-readable tangible storage medium and program instructions stored on at least one of the one or more tangible storage medium, the program instructions executable by a processor capable of performing a method, the method comprising:
receiving a surface profile of a flexible display device;
determining whether the surface profile indicates that a flexible display device surface is flat;
in response to determining the surface profile does not indicate that the flexible display device surface is flat, identifying a viewing direction of a user relative to the surface profile;
identifying an optimal viewing configuration of the flexible display device based on the viewing direction of the user;
presenting the optimal viewing configuration to the user via an augmented reality (AR) device in communication with the flexible display device; and
adjusting a display of digital content on a screen of the flexible display device based on the identified optimal viewing configuration.

16. The computer program product of claim 15, further comprising:
receiving feedback from the user regarding a preferred viewing direction and a preferred configuration of the flexible display device; and
recording the preferred viewing direction and the preferred configuration of the flexible display device based on the received feedback.

17. The computer program product of claim 15, further comprising:
in response to determining the surface profile does indicate that the flexible display device surface is flat, determining whether the user is looking directly at the flexible display device; and
in response to determining the user is not looking directly at the flexible display device, identifying the viewing direction of the user relative to the surface profile.

18. The computer program product of claim 15, wherein the surface profile is received from a plurality of bend and stress sensors embedded in the flexible display device.

19. The computer program product of claim 15, wherein the augmented reality (AR) device is used to present the optimal viewing configuration to the user as a digital image overlay.

20. The computer program product of claim 15, wherein adjusting the display of digital content on the screen of the flexible display device further comprises:
analyzing a depth of the digital content;
determining whether the digital content is configured to be displayed in 3D based on the depth; and
in response to determining the digital content is configured to be displayed in 3D, presenting a 3D viewing configuration of the flexible display device to the user.

* * * * *